No. 705,623. Patented July 29, 1902.
G. W. STEVENS.
BRAKE.
(Application filed Dec. 5, 1901.)
(No Model.)
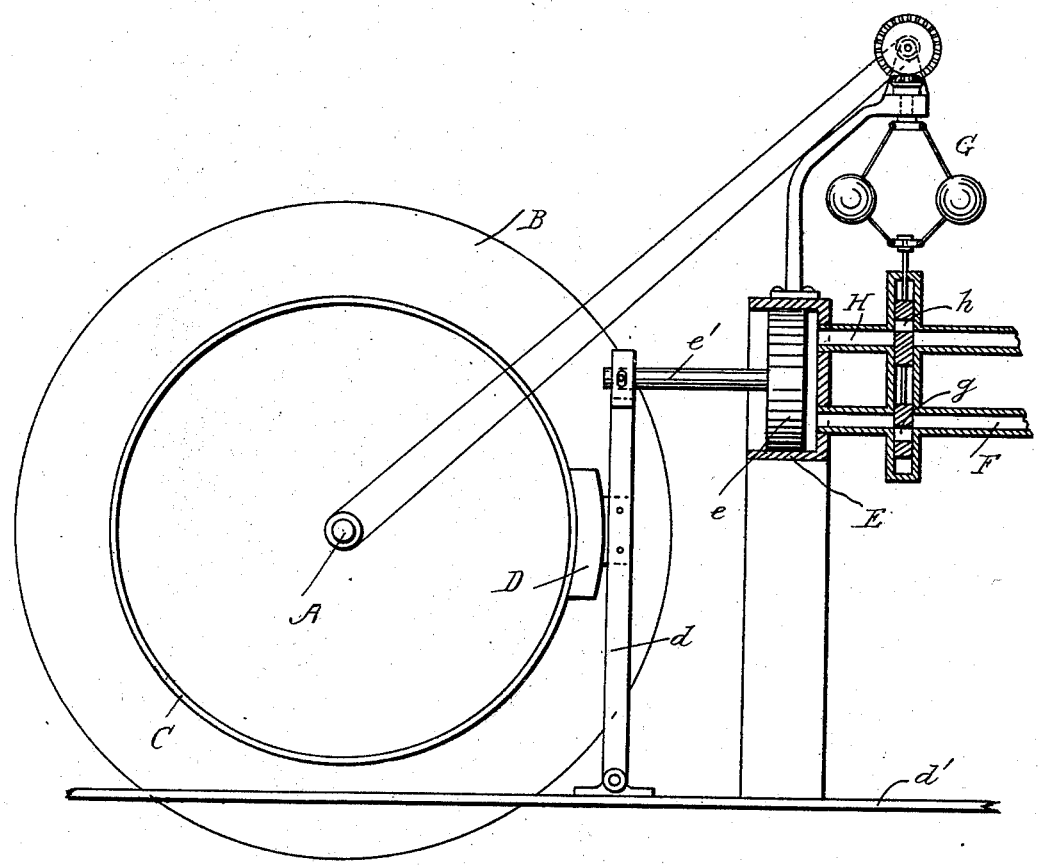
WITNESSES
INVENTOR
George W. Stevens.
by Herbert W. Jenner,
Attorney

UNITED STATES PATENT OFFICE.

GEORGE W. STEVENS, OF BOSTON, MASSACHUSETTS.

BRAKE.

SPECIFICATION forming part of Letters Patent No. 705,623, dated July 29, 1902.

Application filed December 5, 1901. Serial No. 84,782. (No model.)

*To all whom it may concern:*

Be it known that I, GEORGE W. STEVENS, a citizen of the United States, residing at Boston, in the county of Suffolk and State of Massachusetts, have invented certain new and useful Improvements in Brakes; and I do hereby declare the following to be a full, clear, and exact description of the invention, such as will enable others skilled in the art to which it appertains to make and use the same.

This invention relates to brakes for steam-engines and other motors or machines which sometimes run too fast; and it consists in the novel construction and combination of the parts hereinafter fully described and claimed.

In the drawing the figure is a diagram showing a sectional side view of the brake mechanism.

A is the crank-shaft of a steam-engine or other motor or machine, and B is the fly-wheel secured on it.

C is a brake-wheel secured on the shaft A, and this wheel may also be its driving-belt pulley.

D is a brake supported by a brake-lever $d$, which is pivoted at one end to any stationary support, such as the floor $d'$.

E is a cylinder, and $e$ is a piston which works in it. A piston-rod $e'$ connects the piston $e$ with the brake-lever $d$. The cylinder E is connected with any approved source of power, such as a steam-boiler or a reservoir of compressed air, by a supply-pipe F.

G is a speed-governor which is driven from the shaft A in any approved manner. The speed-governor itself is of any approved construction, and $g$ is a valve in the supply-pipe F which is opened by the governor when the said governor exceeds a prearranged speed.

H is a pipe which leads out of the cylinder E, and $h$ is a valve in the pipe H, which is closed by the governor whenever the valve $g$ is opened.

When the engine loses its load and runs too fast, the governor opens the valve $g$, and the brake is pressed against the brake-wheel. When the engine returns to its normal speed, the governor closes the valve $g$ and opens the valve $h$, which lets all the pressure remaining in the cylinder pass out of it, so that the brake is thrown entirely out of action.

What I claim is—

The combination, with a brake-wheel, and a pivoted brake-lever provided with a brake for bearing against the said brake-wheel; of a cylinder provided with a piston and a piston-rod for operating the brake-lever, an inlet-valve and an outlet-valve connected with the said cylinder, and a speed-governor operatively connected with the said brake-wheel and operating to open the inlet-valve and close the outlet-valve when the brake-wheel is revolved too quickly, substantially as set forth.

In testimony whereof I affix my signature in presence of two witnesses.

GEORGE W. STEVENS.

Witnesses:
    ALICE J. MURRAY,
    FRED. K. DAGGETT.